July 15, 1941.  J. S. THOMPSON  2,249,586
CONSTANT FLOW VALVE OR SPILLWAY
Filed Nov. 29, 1938  4 Sheets-Sheet 1
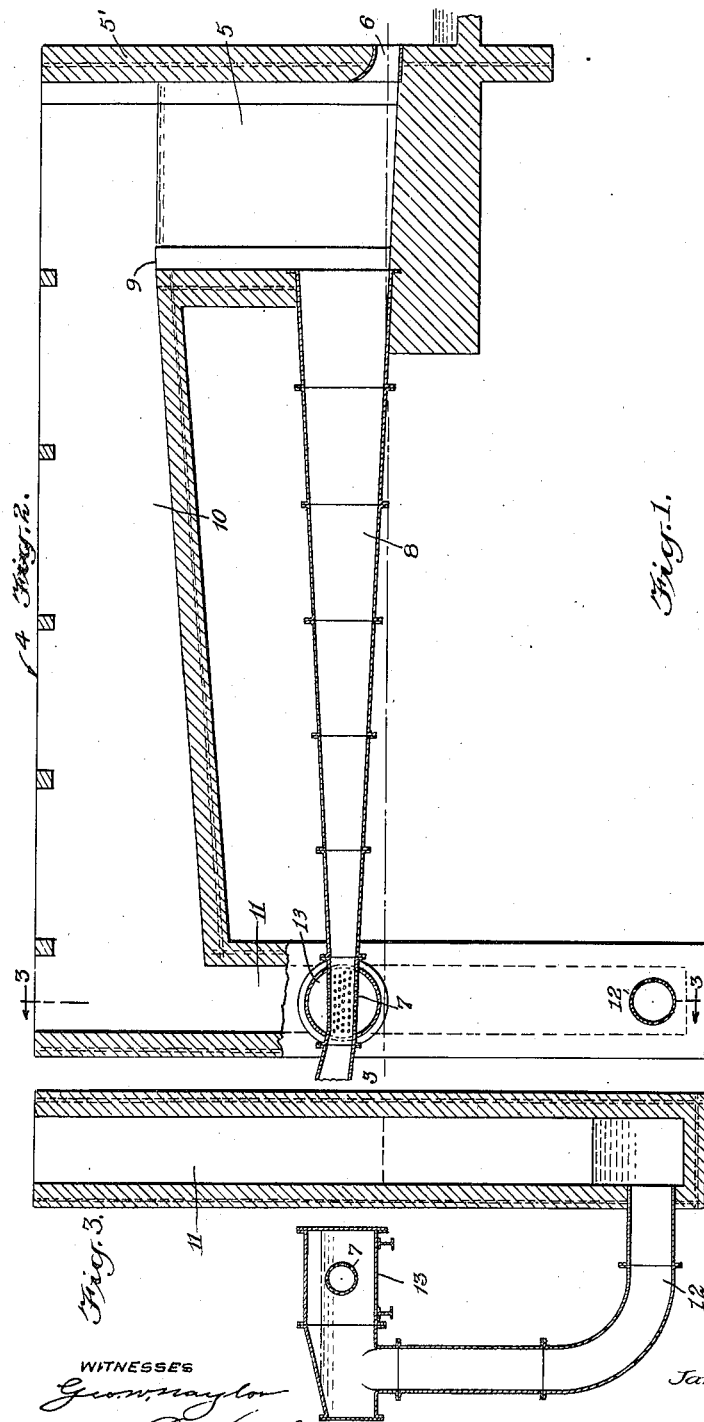
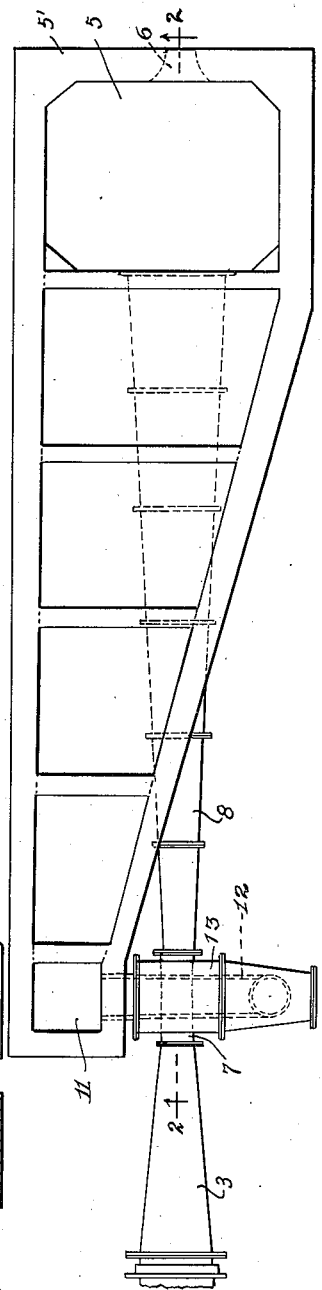
WITNESSES
INVENTOR
James Scott Thompson
BY
ATTORNEYS

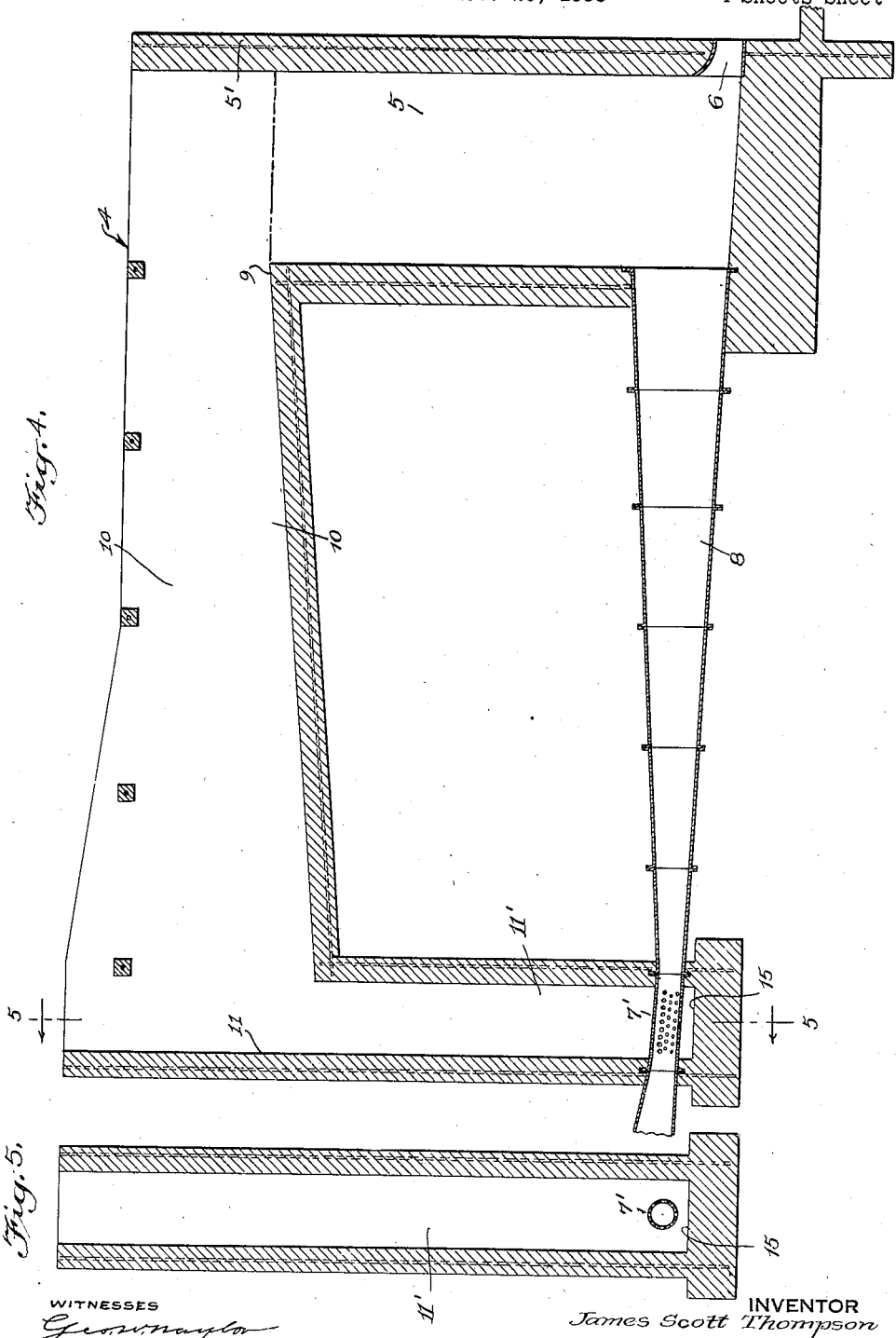

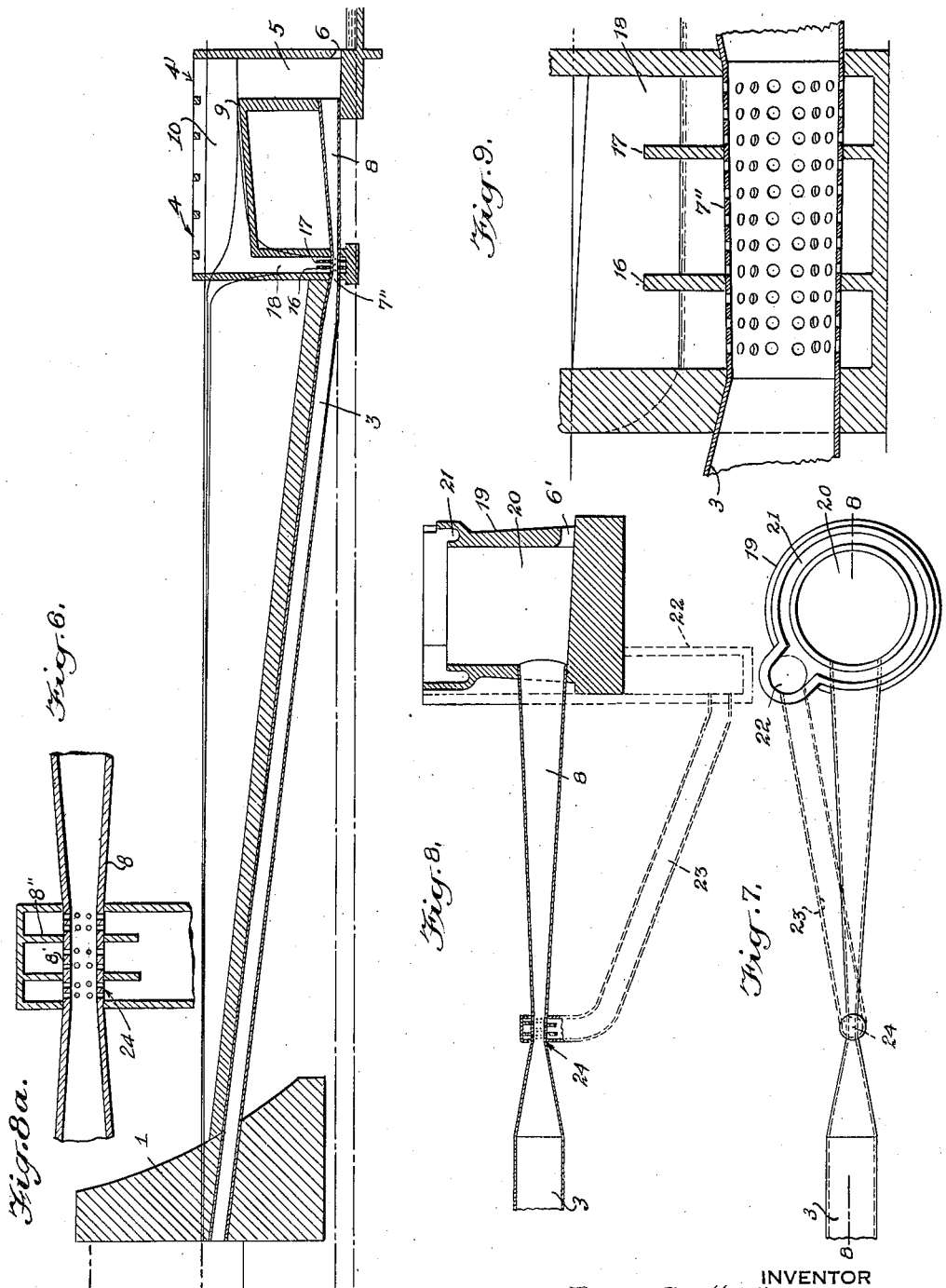

July 15, 1941.   J. S. THOMPSON   2,249,586
CONSTANT FLOW VALVE OR SPILLWAY
Filed Nov. 29, 1938   4 Sheets-Sheet 4
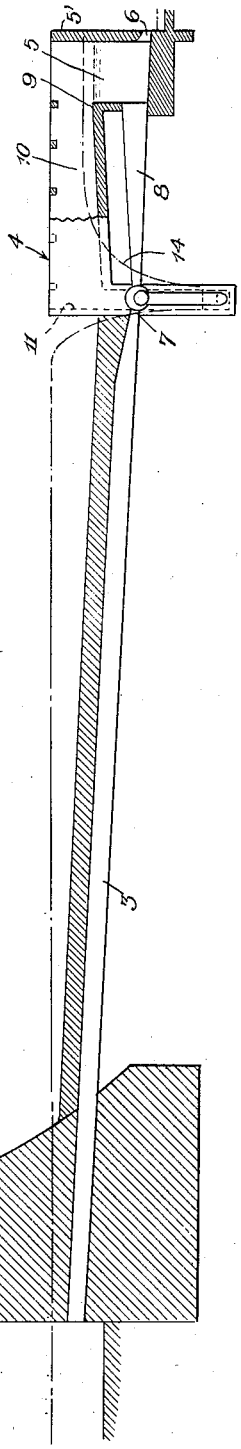
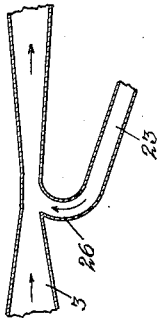
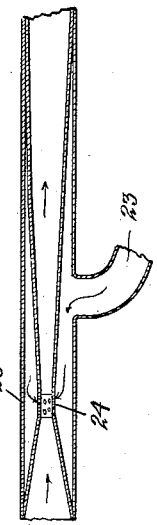
INVENTOR
James Scott Thompson Patented July 15, 1941

2,249,586

UNITED STATES PATENT OFFICE 2,249,586

CONSTANT FLOW VALVE OR SPILLWAY

James Scott Thompson, Hackensack, N. J.

Application November 29, 1938, Serial No. 242,901

4 Claims. (Cl. 61—18)

This invention relates to an improved constant flow valve or spillway and has for an object to provide an improved simplified construction wherein a substantially definite regulation of the flow of water from a reservoir may be secured within certain limits.

Another object of the invention is to provide a constant flow spillway wherein the outlet from the reservoir is checked automatically without the use of any moving parts until the water in the reservoir moves about a certain point.

A further object, more specifically, is to provide a constant flow spillway or valve for reservoirs wherein a perforated throat is used in connection with a venturi, a well having an outlet and means for directing the water from the well to the throat so as to maintain a substantially constant flow of water through the outlet until the level of the water in the reservoir rises above a certain height.

An additional object of the invention is to provide an improvement over the construction shown in my prior Patent No. 2,130,936.

In the accompanying drawings—

Fig. 1 is a top plan view of the constant flow valve or spillway disclosing an embodiment of the invention;

Fig. 2 is a sectional view through Fig. 1 approximately through the lines 2—2, one of the walls being eliminated for the purpose of clearness;

Fig. 3 is a transverse sectional view through Fig. 2 approximately on the line 3—3;

Fig. 4 is a view similar to Fig. 2 disclosing a modified embodiment of the invention;

Fig. 5 is a transverse sectional view through Fig. 4 approximately on the line 5—5;

Fig. 6 is a longitudinal vertical sectional view through a modified form of the invention together with part of a dam or reservoir;

Fig. 7 is a top plan view of the structure shown at the right-hand end of Fig. 6, the same being on a reduced scale;

Fig. 8 is a sectional view through Fig. 7 approximately on the line 8—8;

Fig. 8a is an enlarged vertical section of the throttle shown in Fig. 8.

Fig. 9 is an enlarged fragmentary sectional view showing the construction of a throat and associated parts illustrated in Fig. 6;

Fig. 10 is a fragmentary view showing a modified construction to that illustrated in Fig. 8;

Fig. 11 is a fragmentary sectional view showing a modified construction to that illustrated in Fig. 10; and Fig. 12 is a sectional view similar to Fig. 6 but showing in operative position the construction illustrated in Figs. 1 to 3.

Referring to the accompanying drawings by numerals, 1 indicates a dam which is shown with a head of water almost to the top of the dam 1, as indicated by the dot and dash line 2. A pipe 3 extends through the dam 1 to permit impounded water to pass from the reservoir. If this is a clean open pipe more water would pass through the pipe at a high head of water in the reservoir than a low head. However, according to the present invention means have been provided at the lower end of the pipe 3 to cause a substantially constant flow of water through outlet 6 regardless of the head of water in the reservoir. The pipe 3 may be of metal, concrete or other material and may vary in length. Two hundred feet has been found to be a desirable length of pipe for a large reservoir and a construction 4 has been arranged at the lower end of the pipe. This construction is the spillway or valve for causing the substantially constant flow of water from the reservoir during the functioning of the spillway and up to the limit of its capacity. As indicated particularly in Fig. 12, the water flows through the pipe 3 into an enclosure 5 which functions as a well. An outlet 6 is provided at the bottom of the well 5. This outlet is open constantly and the construction 4 is aimed to cause a substantially constant flow through the opening 6 so that substantially the same volume of water will flow through opening 6 each hour. As the water rises in the well a slightly higher pressure will be exerted on the water flowing through the opening 6 but the difference in pressure will be so slight that the additional escape of water will be negligible. As hereinafter more fully described, water passing from pipe 3 passes through a throat 7 (Fig. 2) and then into and through the conical-shaped section 8 into the well 5. As the water builds up or rises in the well 5 a certain resistance to the flow of water through throat 7 is provided until the water overflows the point 9 whereupon some of the water will move back through the passageway 10 into the throat well 11. This is shown more particularly in Fig. 2. Water flowing through the passageway 10 will enter the throat well 11 and naturally will fall to the bottom, as illustrated in Fig. 3. The throat 7 is not in the well 11 but is arranged on one side thereof, as illustrated particularly in Figs. 1 and 3. It will be noted that a pipe 12 opens into the bottom of well 11 and then extends upwardly parallel to the well where it is formed with an enlargement 13 and in this enlargement the throat 7 is located. The throat 7 is perforated so that as the water in the well 11 moves upwardly until it is as shown in Fig. 3 some of the water will pass through all of the apertures in the throat and produce a throttling effect. This throttling effect will continue until the water in the well 5 has reached the top of the wall 5', after which the throat will merely act as an orifice for the water to pass out because the head of water in the reservoir is higher than the capacity of the valve or spillway. As the water passes from the pipe 3 into the throat 7 some of it will naturally pass out through the apertures but this is rather small as the water is moving at some considerable speed. However, as the water in well 11 or 11' becomes deeper and deeper a greater and greater throttling action is secured so as to hold the flow of water through outlet 6 substantially constant notwithstanding the continued increase of head of water above the dam 1. The throat 7 tapers or rather flares slightly from the inlet end to the outlet end and this flare is preferably continued in the section 8 until it discharges into the well 5. It will, therefore, be seen that the operation of the valve or spillway naturally divides itself into two periods. The first period or functioning of the spillway is up to the time of the overflowing of the well 5 while the second period is during the time the well is overflowing. In the first period the elevation of the water in well 5 represents the static pressure line 14 shown in Fig. 12 at the throat and is controlled by the throat and section pressure and varies with the pressure in these two members. In the second period during which the throttling occurs by reason of the overflow of water from well 5, the reverse is the case, namely, the elevation of the water in the well 11 controls the throat pressure. If the water should rise so high above the dam as to cause water in the well to overflow wall 5' the functioning of the device would cease.

In Fig. 4 a modified structure is shown wherein the same general arrangement as shown in Fig. 2 is disclosed except the throat 7' extends through well 11'. The throat 7', as shown in Fig. 4, is spaced above the bottom 15 of the well 11' and, consequently, as water from well 5 passes into well 11', there will be a gradually increasing pressure against the throat externally and this pressure will naturally cause the water to pass through the apertures in the throat and produce a greater and greater throttling action as the water in well 11' builds up to maximum height.

In Figs. 6 to 9 inclusive, another form of the invention is shown wherein the same principle is involved but wherein slightly different detail structures are used. As illustrated in this form of the invention the construction includes divisional walls 16 and 17, as shown in Fig. 9, for dividing the water in the bottom of the well 18. This form of well is similar to that illustrated in Fig. 4 except for the divisional walls 16 and 17 which cause a more even pressure to be brought upon the throat 7''.

In Figs. 7 and 8 a further slightly modified form of the invention is shown wherein the constant flow of the valve or spillway structure 19 is shown as being circular. The section 8 of the venturi discharges into the well 20, which well has an outlet 6'. When the well 20 overflows it overflows into the annular groove 21 and this groove discharges into an auxiliary well 22 which extends appreciably below the bottom of well 20, as illustrated in dotted lines in Fig. 8. The pipe 23 extends from near the bottom of well 22 to the throat 24 with its construction similar to the throat shown in Fig. 9, namely, with the perforated pipe section 8' surrounded by division walls 8 for dividing the water as it rises in pipe 23. The pipe 23 surrounds the throat 24 so that as the water builds up in well 22, eventually it will produce a pressure against the throat 24 to secure a throttling action. If desired, instead of having the end of the pipe 23 surround the throat 24, as illustrated in Fig. 8, the arrangement could be as shown in Fig. 10, wherein the throat 24 is surrounded by a pipe 25 and the pipe 23 is caused to discharge into pipe 25 below the throat 24. As illustrated in Fig. 11, the pipe 23 is provided with a reverse bend 26 so as to discharge the water in a direction away from the throat 24. Instead of discharging, as shown in Fig. 10, the pipe 23 discharges in a direction slightly toward the outlet of the venturi.

The construction shown in Figs. 10 and 11 is intended primarily as being suitable for small installations while that shown in the preferred form is intended for large installations.

The efficiency of the throat provided with perforations depends upon the proper taper used, namely, a taper which will give a level static pressure line for the length of the throat. This should reduce the resistance caused by the holes to a simple loss of head similar to loss of head due to ordinary surface friction. In the various forms of the invention disclosed, it will be understood that atmospheric pressure is on the surface of the water in well 5 and later on the water in well 11. The top throat pressure (that is, the pressure on the throat 7) is equal to atmospheric pressure minus the weight of the water column to the top of the throat. The level static pressure line is obtained by a slightly divergent throat which will make the sum of the velocity and friction heads at any point constant. This is obtained by a proper taper of the throat that will allow the velocity head to diminish as the friction head increases and their sum will, therefore, remain constant, which leaves the static head constant and the static line level. The operation of the valve begins as the head of water in the well 5 increases so as to maintain a substantially constant flow of water through the outlet 6. Water from the throat fills the siphon, as shown in Figs. 2 and 3, and the siphon well up to the level of the static pressure line at the throat. As the reservoir head increases the discharge increases and the pressure line at the throat lowers and some of the water is brought back through the throat perforations and discharged through the section 8. The surface of the siphon well water represents the static pressure line at any time at the throat. When the well 5 begins to overflow and discharge into the siphon well 11 so as to raise the water level in the siphon well, the throat pressure is increased and the velocity of discharge is reduced. It may also be said that to the extent that any water from the siphon well 11 is drawn into the throat to that extent is the area of the throat reduced for the flow of venture water and the discharge in this way reduced directly.

In all the forms of the invention the general principle is the same, namely, that the overflowing of the well 5 will produce a throttling action to maintain the discharge through the outlet 6 substantially constant.

I claim:

1. A flow valve for a reservoir having a variable head comprising a tubular outlet from said reservoir having a converging outlet, a Venturi tube having a throat flaring from one end to the other and merging into a cone-shaped outlet member, said throat being foraminous from one end to the other, means forming a discharge well at the end of said outlet member for receiving fluid therefrom, said well having an outlet opening, a siphon well, means for directing fluid from said discharge well to the siphon well, and a tubular member extending upwardly from the bottom of said siphon well to said throat, said tubular member surrounding said throat but spaced therefrom whereby liquid from said tubular member will enter said throat and throttle the fluid passing therethrough.

2. A flow valve for maintaining a substantially constant discharge from a reservoir having a variable head, said valve including a tube in free communication with the lower part of said reservoir, a tapering foraminous throat having its smaller end connected to the outlet end of said tube, a conical-shaped tubular section having its smaller end connected to the outlet end of said throat for permitting liquid passing through the throat to expand, means forming a discharge well for receiving liquid from said tubular section, said means having an outlet opening substantially in line with the bottom of the outlet end of said tubular section, and a construction including a siphon well and a passageway from the top of the discharge well to the top of the siphon well, a tubular member surrounding said throat but spaced therefrom, said tubular member extending upwardly from the bottom of the siphon well to said throat whereby liquid passing through said throat to said tubular section will produce a siphoning effect for drawing liquid from the bottom part of said siphon well into said tubular member and throat for producing a throttling effect.

3. A flow valve for maintaining a substantially constant discharge from a reservoir having a variable head, said valve including a Venturi tube in free communication with the lower part of said reservoir and having its small end extending away from the reservoir, a tapering foraminous throat forming an extension of the Venturi tube, a conical-shaped tubular section having its small end connected with the outlet end of said throat, means forming a well for receiving liquid from said tubular section, said means having an outlet, a passageway leading from the top of said well and a siphon well positioned to receive liquid from said passageway when the first mentioned well overflows, a pipe extending from said siphon well to said throat at a point spaced above the bottom of the siphon well, and a plurality of spaced dividing members for dividing the portion of said pipe near said throat into separate compartments whereby liquid from said siphon well will be directed into said throat at a right angle to the flow of liquid through the throat.

4. A flow valve for maintaining a substantially constant discharge from a reservoir having a variable head, said valve including a Venturi tube in free communication with the lower part of said reservoir, said venturi having a perforated throat merging into a conical shaped section, means forming a vertically positioned tubular well having an annular overflow groove at the top merging into a siphon well whereby liquid overflowing into said groove will flow into the siphon well, said conical-shaped section being positioned so that its large end will discharge into said tubular well at the bottom thereof, said tubular well having an outlet opening in line with the lower portion of said section, and a return siphon pipe leading upwardly from the bottom of said siphon well to said throat, said return siphon pipe surrounding said throat so that liquid may be drawn or discharged from said return siphon through the apertures in said throat.

JAMES SCOTT THOMPSON.